United States Patent [19]

Misawa et al.

[11] Patent Number: 5,427,883

[45] Date of Patent: Jun. 27, 1995

[54] TONER COMPOSITION FOR ELECTROPHOTOGRAPHY

[75] Inventors: Akira Misawa; Kazuo Hisamatsu; Keiichi Ishikawa; Kazuo Hagiwara; Masaaki Shin, all of Kanagawa, Japan

[73] Assignee: Mitsui Toatsu Chemicals, Incorporated, Tokyo, Japan

[21] Appl. No.: 343,995

[22] Filed: Nov. 18, 1994

Related U.S. Application Data

[63] Continuation of Ser. No. 995,905, Dec. 22, 1992, abandoned, which is a continuation of Ser. No. 452,581, Dec. 19, 1989, abandoned.

[30] Foreign Application Priority Data

Dec. 26, 1988 [JP] Japan ................................ 63-326313

[51] Int. Cl.$^6$ ............................................. G03G 9/087
[52] U.S. Cl. .................................... 430/109; 430/137; 430/904
[58] Field of Search ..................... 430/109, 904, 137; 528/81; 525/440

[56] References Cited

U.S. PATENT DOCUMENTS

| | | | |
|---|---|---|---|
| 3,684,769 | 8/1972 | Abbott et al. | 525/440 |
| 4,164,114 | 8/1979 | Yabuki et al. | 528/308 |
| 4,533,703 | 8/1985 | Kordomenos et al. | 525/440 |
| 4,833,057 | 5/1989 | Misawa et al. | 430/109 |
| 4,840,863 | 6/1989 | Ostu et al. | 430/110 |
| 4,849,317 | 7/1989 | Sawatari et al. | 430/108 |
| 4,980,448 | 12/1990 | Tajiri et al. | 430/109 X |

FOREIGN PATENT DOCUMENTS

| | | | |
|---|---|---|---|
| 256136 | 2/1988 | European Pat. Off. | |
| 9045455 | 3/1984 | Japan | 430/109 |
| 3056659 | 3/1988 | Japan | 430/109 |

OTHER PUBLICATIONS

Patent Abstracts of Japan, vol. 10, No. 369, JP-A-61 163347, 24 Jul. 1986.
Patent Abstracts of Japan, vol. 6, No. 202, JP-A-57 109867, 8 Jul. 1982.

*Primary Examiner*—Christopher D. Rodee
*Attorney, Agent, or Firm*—Burns, Doane, Swecker & Mathis

[57] ABSTRACT

The present invention provides a toner composition mainly comprising a binder resin (D) which contains at least 20% by weight of an urethane-modified polyester resin (C) obtained by reacting a polyester resin (A) with an isocyanate compound (B) and whose gel fraction ranges from 2 to 75% by weight. The toner composition exhibits good melting properties upon heating suitable for fast reproduction such as a low lower limit of the fixing temperature and a wide range for permitted fixing temperature and is further excellent in resistance to blocking, resistance to carrier contamination and image-forming properties. The binder resin as the main component of the toner composition can be prepared according to a method comprising the step of continuously adding an isocyanate compound (B) to a polyester resin (A) in an equivalent ratio, NCO/OH, of the amount of the NCO groups of the isocyanate compound (B) to that of OH groups of the polyester resin (A) ranging from 0.3 to 1.00 with kneading to react them, in a kneading means having a built-in screw.

10 Claims, No Drawings

TONER COMPOSITION FOR ELECTROPHOTOGRAPHY

This application is a continuation of application Ser. No. 07/995,905, filed Dec. 22, 1992, now abandoned, which is a continuation of application Ser. No. 07/452,581, filed Dec. 19, 1989, now abandoned.

BACKGROUND OF THE INVENTION

The present invention relates to a toner composition for electrophotography, and more specifically, to a toner composition for electrophotography having melting properties upon heating suitable for fast reproduction and excellent carrier contamination resistance and image-forming properties.

With regard to machinery and tools such as copying apparatuses, printers and machines in which an electrophotography technique is employed, it has been strongly desired to suppress carrier contamination by toner particles and formation of fine particles due to the destruction of toner particles as much as possible for the purpose of obtaining images of high quality over a long period of time.

Conventionally, the binder resins most commonly used in toners have been vinylic polymers mainly comprising styrene. The styrenic resins per se are fragile and have low wear resistance. This causes so-called carrier contamination in which the toner particles or fine pieces thereof are adhered or welded onto the surface of carrier particles or a charging blade during a process for mixing the toner particles with the carrier particles or a friction process between the toner and the blade to thus contaminate the surface thereof. Hence the electrical properties of the resulting developer are deteriorated. This causes a reduction in image density. For the same reasons, in the case of one-component toners, are caused serious image defects. For instance, non-image portions are contaminated by fine toner particles generated due to the destruction thereof during mixing the toner particles.

One means for solving this problem is to increase the molecular weight of the binder resin to thus impart tough properties to the toner particles. However, this method causes an increase in the melt viscosity of the toner. As a result, the toner does not have sufficient flow properties during fast reproduction or during hot roll fixing at a relatively low temperature and pressure. Therefore, the permeation or adhesion of the toner to materials to which the toner is fixed becomes insufficient, which in turn leads to so-called insufficient fixing. More specifically, images are easily removed when the images are rubbed after the reproduction.

Another means for solving the foregoing problem is to cover the surface of carriers with a variety of resins to prevent the deterioration of a developer due to the contamination of the carrier. However, the effect of preventing the formation of fine toner particles cannot be expected by this method. Hence it is impossible to completely prevent the occurrence of image defects. Furthermore, this method cannot be applied to so-called one-component developers free of carrier particles.

SUMMARY OF THE INVENTION

Accordingly, an object of the present invention is to provide a toner composition for electrophotography which is tough, and provides excellent flow properties upon heating and fixing ability; which does not cause image defects due to carrier contamination and fine particles formed by the destruction of the toner particles; and which can further provide stable images even when reproduction or printing are carried out over a long time period.

The inventors have conducted various studies to achieve the foregoing object. They have found a specific toner which has good low temperature fixing ability, can prevent carrier contamination and the generation of fine particles due to the destruction of the toner particles, and can provide good stable images for a long time. The toner mainly comprises a binder resin which contains a urethane-modified polyester resin, obtained by reacting a polyester resin with an isocyanate compound, in a specific amount and having a gel fraction falling within a specific range.

According to the present invention, there is provided a toner composition mainly comprising a binder resin (D) which contains at least 20% by weight of a urethane-modified polyester resin (C) obtained by reacting a polyester resin (A) with an isocyanate compound (B), and whose gel fraction ranges from 2 to 75% by weight.

DESCRIPTION OF THE PREFERRED EMBODIMENT

The polyester resins (A) referred to present are those obtained by the polycondensation of a polybasic carboxylic acid or a lower alkyl ester thereof with a polyhydric alcohol. Examples of the polybasic carboxylic acids and lower alkyl esters thereof are aliphatic dibasic acids such as malonic acid, succinic acid, glutalic acid, adipic acid, azelaic acid, sebacic acid and hexahydrophthalic acid anhydride; aliphatic unsaturated dibasic acids such as maleic acid, maleic anhydride, fumaric acid, iraconic acid and citraconic acid; aromatic dibasic acids such as phthalic anhydride, phthalic acid, terephthalic acid and isophthalic acid; and methyl esters as well as ethyl esters thereof. Among these, aromatic dibasic acids such as phthalic acid, terephthalic acid and isophthalic acid and a lower alkyl ester thereof are preferred.

Examples of the polyhydric alcohols are diols such as ethylene glycol, 1,2-propylene glycol, 1,3-propylene glycol, 1,3-butylene glycol, 1,4-butylene glycol, 1,6-hexanediol, neopentyl glycol, diethylene glycol, dipropylene glycol, hydrogenated bisphenol A, bisphenol A - ethylene oxide adduct and bisphenol A - propylene oxide adduct; triols such as glycerin, trimethylolpropane and trimethylolethane; and mixtures thereof. Among these, neopentyl glycol, trimethylolpropane, bisphenol A - ethylene oxide adduct, bisphenol A - propylene oxide adduct and a mixture of at least 40 mol% of bisphenol A - propylene oxide adduct with other polyhydric alcohols, are preferred. Bisphenol A - propylene oxide adduct and a mixture of at least 40 mol% of bisphenol A - propylene oxide adduct with other polyhydric alcohols are particularly preferred.

The foregoing polycondensation can be performed according to known high temperature polycondensation or solution polycondensation techniques.

The amount of the polybasic carboxylic acid and the polyhydric alcohol are generally selected so that the ratio (OH/COOH) of the number of OH groups of the polyhydric alcohol to the number of COOH groups of the polybasic carboxylic acid ranges from 0.8 to 1.4. In addition, the hydroxyl value of the polyester resin (A) preferably ranges from 6 to 100.

Examples of the isocyanate compounds (C) are hexamethylene diisocyanate, isophorone diisocyanate, tolylene diisocyanate, diphenylmethane diisocyanate, xylylene diisocyanate, tetramethylxylylene diisocyanate and triphenylmethane triisocyanate.

Moreover, it is optionally possible to use oligomers such as triisocyanates obtained by reacting the above diisocyanates.

The urethane-modified polyester resin (C) is obtained by reacting the polyester (A) with isocyanate compound (B) at a temperature, for instance, ranging from 50° to 200° C. to obtain an intended urethane-modified polyester resin. There is limitation in the compounding ratio of the polyester resin (A) to the isocyanate compound (B) upon reacting, but the polyester resin (A) is preferably reacted with the isocyanate compound (B) in an equivalent ratio (NCO/OH) of the amount of NCO groups of the isocyanate compound (B) to that of OH groups of the polyester resin (A), which ranges from 0.3 to 1.0.

The amount of the urethane-modified polyester resin (C) to be incorporated into the binder resin (D) should be at least 20% by weight and preferably not less than 40% by weight. If the amount of the urethane-modified polyester resin (C) incorporated into the binder resin (D) is less than 20% by weight, the resistance to carrier contamination of the toner obtained from such a binder resin (D) is lowered.

On the other hand, it is an essential requirement in the present invention that the gel fraction of the binder resin (D) should be in the range of from 2 to 75% by weight, preferably 10 to 60% by weight. If the gel fraction is less than 2% by weight, the breaking strength of the toner is lowered and hence the fixing ability of the toner is impaired. If it exceeds 75% by weight, the flow properties upon heating of the toner is lowered and hence the fixing ability thereof will also be lowered. The gel fraction can be controlled by adjusting various factors such as the content of the polyhydric alcohol moiety in polyester resin (A), the amount of polyester resin (A) to be incorporated into binder resin (D) and the amount of isocyanate compound (B) to be reacted with polyester resin (A).

The binder resin (D) can be prepared by adding isocyanate compound (B) in a portion or portions to polyester resin (A), optionally in the presence of a second resin at a temperature ranging from 60° to 180° C. in the presence or absence of a solvent, and reacting them at that temperature for several minutes to several hours.

Alternatively, binder resin (D) may also be prepared by continuously adding isocyanate compound (B) to polyester resin (A), optionally in the presence of the second resin with kneading to react them, utilizing a kneading means having a built-in screw. Preferred kneading means are extruders, in particular twin-screw extruders. The ratio (L/D) of the length (L) to the diameter (D) of the screw preferably ranges from 20 to 60. The kneading is generally performed at a temperature ranging from 20° to 200° C. and a residence time ranging from 5 to 30 minutes.

The second resins as used herein are not restricted to specific ones, so long as they can be used in toners, have a hydroxyl value of not more than 5 mgKOH/g and they do not substantially react with isocyanate compound (B). Examples of such second resins preferably used in the invention are styrenic resins, polyester resins, epoxy resins, rosins modified with maleic acid and petroleum resins having a hydroxyl value of not more than 5 mgKOH/g. The amount of the second resin is not critical provided that the amount of the urethane-modified polyester resin (C) in binder resin (D) is not less than 20% by weight.

A most general method for preparing the toner composition for electrophotography according to the present invention comprises, for instance, mixing binder resin (D) which has been pulverized to form particles having a particle size ranging from about 0.5 to 5 mm with a proper coloring agent, a small amount of a charge controlling agent, and optionally styrenic resins, polyester resins, epoxy resins, rosins modified with maleic acid or petroleum resins as well as additives in a mixer such as Henschel Mixer, melting and kneading the mixture at a temperature ranging from 100° to 150° C. in a kneader or the like, grinding the resultant mass and classifying the resulting particles to thus obtain classified particles having a particle size ranging from 5 to 20 microns.

Examples of proper coloring agents are carbon black, Aniline Blue, Alkoyl Blue, Chrome Yellow, Ultramarine Blue, Quinoline Yellow, Methylene Blue, Phthalocyanine Blue, Malachite Green, Rose Bengale and magnetite.

In addition, known charge controlling agents can be incorporated into the toner composition. Examples thereof include Nigrosines, triphenylmethane type dyes and chromium complex of 3,5-di-tert-butylsalicylic acid.

Known additives can be used in the toner composition of the invention. Specific examples thereof are colloidal silica, zinc stearate, low molecular weight polypropylene, stearic acid amide and methylene bisstearoamide.

The toner composition for electrophotography provides excellent fixing ability at low temperature and pressure, does not cause any image defects due to contamination of carriers, fine toner particles formed by the destruction thereof or the like, and makes it possible to always provide stable good images. Further, the toner composition provides excellent in storability and resistance to migration of vinyl chloride plasticizers, as well as offset resistance which is usually required for the heating roll fixing. Therefore, the toner composition of the invention is quite excellent as toners for copying apparatuses, printers and facsimile machines.

The present invention will be explained in more detail with reference to the following non-limitative working Examples and Preparation Examples.

In the following Examples and Preparation Examples, the term "part" means "part by weight" unless otherwise specified.

PREPARATION EXAMPLES A1 to A9

These Preparation Examples are given for illustrating the preparation of polyester resins (A).

To a 5 liter-volume 4-necked flask equipped with a reflux condenser, a water separator, an inlet for nitrogen gas, a thermometer and a stirring machine, there were added polybasic acids and polyhydric alcohols of which kinds and amounts were shown in the following Table-1 and dehydration polycondensation was performed at a temperature ranging from 220° to 240° C. with introducing nitrogen gas into the flask. The polycondensation reaction was stopped at the time when the acid value of the resulting product became less than 1 to thus obtain polyester resins A1 to A9. Properties of the resultant resins are listed in Table-1.

PREPARATION EXAMPLES D1 to D27

These Preparation Examples are given for illustrating the preparation of the binder resins (D).

The polyester resins (A) shown in Table-1 and the second resins listed in Table-3 each were pulverized to form particles thereof having a particle size ranging from 0.5 to 1 mm, weighed out in an amount shown in the following Table-2 and they were premixed in a Henschel Mixer. The premixed product was modified with urethane in a twin-screw extruder (KRC S-01; available from KURIMOTO LTD.) in the following manner. Regarding the extrusion conditions, the temperature of the cylinder of the extruder was set so that the temperature of the resin was 150° C. and the number of revolution of the screw was adjusted so that the average residence time of the resin therein was equal to 20 minutes. The modification of the resin with urethane was performed by continuously feeding the premixed resin to the extruder at a desired flow rate using a quantity measuring feeder to perform melting and kneading of the resin continuously feeding a desired amount (see Table-2) of an isocyanate (B) through a first vent hole fitted to the extruder, using a constant rate pump to perform the modification reaction. The resulting binder resin (D) was cooled and subjected to granulation.

EXAMPLE

After granulating the binder resins D1 to D27 obtained in Preparation Examples D1 to D27 to obtain particles having a particle size ranging from 0.5 to 2 mm with a granulator, 93 parts of the particles of the resin, 5 parts of carbon black (MA100, available from MITSUBISHI CHEMICAL INDUSTRIES LTD.) and 2 parts of Spiron Black TRH (available from HODOGAYA CHEMICAL CO., LTD.) were combined together, dispersed and mixed in a Henschel Mixer and then molten and kneaded at 160° C. in a twin-screw kneader PCM 30 (available from IKEGAI STEEL CO., LTD.) to thus obtain a toner composition in the form of mass. The composition was granulated with a hammer mill, finely pulverized with a pulverizer (MODEL 1DS2; available from Japan Pneumatic Co., ltd.) and then subjected to pneumatic classification to obtain toner particles having an average particle size of about 10 microns (about 3% by weight: not more than 5 microns; about 2% by weight: not less than 20 microns).

4 Parts of the toner particles were mixed with 96 parts of Ferrite Carreir (F-150; available from Japan Iron Powder Co., Ltd.) to form a developer.

Using a commercially available copying apparatus of a magnetic brush heat roll type system provided with a selenium photosensitive material, a reproduction test was carried out by changing the fixing temperature and the results observed were summarized in Table-2. In addition, the storability of the toner particles and the change in image quality as well as the degree of carrier contamination observed during the reproduction test over a long time period are also listed in Table-2.

In Table-3, the kinds of the second resins used in this Example are listed. In this Table, PE-1 and PE-2 were prepared in the same manner used in Preparation Examples A1 to A9. Moreover, SA-1 to SA-3 and SB-1 to SB-2 are samples commercially available.

In Tables, Mn and Mw are number-average molecular weight and weight-average molecular weight determined by gel permeation chromatography (GPC), respectively. In addition, "Tg" in Tables 2 and 3 represents glass transition temperature determined by a differential scanning calorimeter.

Besides, each note in Tables 1 to 2 is as follows:
Note 1) Bisphenol A - propylene oxide adduct available from MITSUI TOATSU CHEMICALS INC.;
Note 2) Determined by a method according to JIS K5400;
Note 3) Determined by pyridine-acetic anhydride method;
Note 4) 2,4-tolylene diisocyanate;
Note 5) 25 Grams of the binder resin (D) which had been pulverized and passed through 150 mesh sieve was introduced into ethyl acetate in a one liter volume container of polymer and shaken in a shaker for one hour to dissolve the same.

The ethyl acetate solution was filtered through a 500 mesh sieve of stainless steel whose weight had accurately been determined previously to remove its gel fraction and the weight of the sieve was precisely determined after drying it in vacuo for 24 hours to calculate the gel fraction;

Note 6) The storability of the resulting toners were estimated according to the following 4-stage evaluation standard by visually observing the degree of aggregation of powder after allowing the toner prepared to stand at 50° C. and a relative humidity of 50% for 24 hours:
⊚: no aggregates;
○: a few aggregates, but they get loose by gently shaking the container;
Δ: some aggregates still remains even when the container is sufficiently shaken;
×: completely conglomerated.

Note 7) The lowest surface temperature of the heating roll for fixing required for achieving not less than 90% of the rate of residual weight of a toner layer on a 2 cm×2 cm solid black portion of an image, the rate of residual weight of the toner being determined by measuring the weight of the residual toner which remains thereon even after rubbing it 50 times with a sand eraser under a load of 125 g/cm$^2$, with a tester for fastness to rubbing according to Japan Society for Promotion of Scientific Research (available from DAIEI SCIENTIFIC PRECISION MACHINE MANUFACTURING CO., LTD.):

Note 8) The lowest surface temperature of the heating roll for fixing at which there is observed the initiation of so-called offset phenomenon in which molten toners are adhered onto the heating roll surface and the adhered toners are again fixed on the subsequent copying paper;

Note 9) A commercially available polyvinyl chloride sheet (containing 50% by weight of dioctyl phthalate; available from MITSUI TOATSU CHEMICAL INC.) was superposed onto a 5 cm×5 cm solid black portion of an image reproduced by toners, allowed to stand at 50° C. for 24 hours under a load of 20 g/cm$^2$ and the sheet was peeled off at room temperature. The condition of transfer of the toner to the polyvinyl chloride sheet was visually evaluated according to the following 4-stage evaluation standard:
⊚: Observed no transfer of dyes and toners;
○: Only dyes are transferred;
Δ: A part of the toner is transferred;

×: Most of the toners are transferred.

Note 10) After reproducing 50,000 copies, the degree of blackness on the solid black portion of an image was evaluated visually;

Note 11) The degree of background contamination on the non-image area with the toner on the copying paper was visually evaluated after reproducing 50,000 copies according to the following 4-stage evaluation standard:
⊙: no background contamination;
○: slight background contamination;
Δ: substantial background contamination;
×: severe background contamination.

Note 12) Electron micrographs of the surface condition of the carrier was taken by a scanning electron microscope after reproducing 50,000 copies and they were evaluated according to the following standard:
⊙: There is no adhesion of toners;
○: A small amount of toners is adhered thereto;
Δ: A substantial amount of toners is adhered thereto;
×: A large amount of toners is adhered thereto.

TABLE 1

| Polyester resin (A) No. | Preparation Examples A-1 to A-9 | | | | | | | | |
|---|---|---|---|---|---|---|---|---|---|
| | A-1 | A-2 | A-3 | A-4 | A-5 | A-6 | A-7 | A-8 | A-9 |
| KB 3000K (g) Note 1) | 2064.0 | 2064.0 | 2064.0 | 2064.0 | 2064.0 | 2064.0 | 2408.0 | 2064.0 | 2064.0 |
| Neopentyl glycol (g) | 395.2 | 374.4 | 353.6 | 332.8 | 312.0 | 0.0 | 0.0 | 353.6 | 0.0 |
| Diethylene glycol (g) | 0.0 | 0.0 | 0.0 | 0.0 | 0.0 | 360.4 | 254.4 | 0.0 | 360.4 |
| Trimethylol propane (g) | 26.8 | 53.6 | 80.4 | 107.2 | 134.0 | 80.4 | 80.4 | 80.4 | 80.4 |
| Isophthalic acid (g) | 1462.8 | 1477.2 | 1491.7 | 1506.2 | 1520.7 | 1491.7 | 1491.7 | 0.0 | 0.0 |
| Terephthalic acid (g) | 0.0 | 0.0 | 0.0 | 0.0 | 0.0 | 0.0 | 0.0 | 1491.7 | 1491.7 |
| Amount of water removed | 312.5 | 315.7 | 318.8 | 321.8 | 325.1 | 318.6 | 318.7 | 318.8 | 318.7 |
| OH/COOH ratio prior to reaction | 1.16 | 1.16 | 1.16 | 1.16 | 1.16 | 1.16 | 1.16 | 1.16 | 1.16 |
| Acid value (mg KOH/g) Note 2) | 0.8 | 1.0 | 0.7 | 0.8 | 0.7 | 0.9 | 0.8 | 0.7 | 0.8 |
| Hydroxyl value (mg KOH/g) Note 3) | 49.3 | 49.4 | 49.6 | 49.9 | 50.0 | 49.7 | 47.5 | 49.6 | 49.6 |
| Yield of resin (g) | 3636.2 | 3653.5 | 3670.9 | 3688.4 | 3705.6 | 3677.9 | 3915.8 | 3670.9 | 3677.8 |

TABLE 2

| Binder resin (D) | Preparation Examples D-1 to D-27 | | | | | | |
|---|---|---|---|---|---|---|---|
| | D-1 | D-2 | D-3 | D-4 | D-5 | D-6 | D-7 |
| Polyester resin (A) No. | A-1 | A-2 | A-3 | A-4 | A-5 | A-6 | A-7 |
| Second resin No. | PE-1 | PE-1 | PE-1 | PE-1 | PE-1 | PE-1 | PE-1 |
| Mixing ratio, polyester/second resin | 40/60 | 40/60 | 40/60 | 40/60 | 40/60 | 40/60 | 40/60 |
| Flow rate of mixed resin (kg/hr) | 5 | 5 | 5 | 5 | 5 | 5 | 5 |
| Isocyanate | 2,4-TDI Note 4) | 2,4-TDI | 2,4-TDI | 2,4-TDI | 2,4-TDI | 2,4-TDI | 2,4-TDI |
| Flow rate of isocyanate (g/hr) | 124.8 | 125.1 | 125.61 | 126.3 | 126.5 | 125.8 | 120.2 |
| Gel fraction (wt %) Note 5) | 2.5 | 12 | 25 | 37 | 45 | 26 | 24 |
| Flow tester Tm value (°C.) | 132 | 148 | 155 | 160 | 165 | 155 | 156 |
| Tg (°C.) | 68 | 70 | 72 | 73 | 74 | 65 | 68 |
| Storability Note 6) | ⊙ | ⊙ | ⊙ | ⊙ | ⊙ | ⊙ | ⊙ |
| Lowest fixing temperature (°C.) Note 7) | 175 | 164 | 152 | 145 | 141 | 150 | 152 |
| Offset initiation temperature (°C.) Note 8) | 190 | 210 | 230< | 230< | 230< | 230< | 230< |
| Resistance to migration to polyvinyl chloride plasticizer Note 9) | ⊙ | ⊙ | ⊙ | ⊙ | ⊙ | ⊙ | ⊙ |
| Image density Note 10) | high | high | high | high | high | high | high |
| Background contamination Note 11) | ⊙ | ⊙ | ⊙ | ⊙ | ⊙ | ⊙ | ⊙ |
| Carrier contamination Note 12) | ⊙ | ⊙ | ⊙ | ⊙ | ⊙ | ⊙ | ⊙ |
| Inside or outside of scope of the present invention | inside | inside | inside | inside | inside | inside | inside |

| | D-8 | D-9 | D-10 | D-11 | D-12 | D-13 | D-14 | D-15 |
|---|---|---|---|---|---|---|---|---|
| Polyester resin (A) No. | A-8 | A-9 | A-3 | A-3 | A-3 | A-3 | A-3 | A-3 |
| Second resin No. | PE-1 | PE-1 | PE-1 | PE-1 | PE-1 | PE-1 | PE-1 | PE-1 |
| Mixing ratio, polyester/second resin | 40/60 | 40/60 | 15/85 | 20/80 | 30/70 | 50/50 | 60/40 | 70/30 |
| Flow rate of mixed resin (kg/hr) | 5 | 5 | 5 | 5 | 5 | 5 | 5 | 5 |
| Isocyanate | 2,4-TDI | 2,4-TDI | 2,4-TDI | 2,4-TDI | 2,4-TDI | 2,4-TDI | 2,4-TDI | 2,4-TDI |
| Flow rate of isocyanate (g/hr) | 125.6 | 125.6 | 47.1 | 62.8 | 94.2 | 156.9 | 188.3 | 219.7 |
| Gel fraction (wt %) Note 5) | 25 | 27 | 7.5 | 13 | 18 | 42 | 58 | 67 |
| Flow tester Tm value (°C.) | 154 | 155 | 125 | 127 | 130 | 156 | 158 | 165 |
| Tg (°C.) | 74 | 70 | 68 | 69 | 68 | 72 | 74 | 75 |
| Storability Note 6) | ⊙ | ⊙ | ⊙ | ⊙ | ⊙ | ⊙ | ⊙ | ⊙ |
| Lowest fixing temperature (°C.) Note | 155 | 154 | 175 | 162 | 158 | 151 | 148 | 156 |
| Offset initiation temperature (°C.) Note 8) | 225 | 230 | 178 | 182 | 188 | 220 | 230< | 230< |
| Resistance to migration to polyvinyl chloride plasticizer Note 9) | ⊙ | ⊙ | ○ | ○ | ○ | ⊙ | ⊙ | ⊙ |
| Image density Note 10) | high | high | Slightly low | high | high | high | high | high |
| Background contamination Note 11) | ⊙ | ⊙ | Δ | ○ | ⊙ | ⊙ | ⊙ | ⊙ |
| Carrier contamination Note 12) | ⊙ | ⊙ | × | Δ | ○ | ⊙ | ⊙ | ⊙ |
| Inside or outside of scope of the present invention | inside | inside | outside | inside | inside | inside | inside | inside |

| | D-16 | D-17 | D-18 | D-19 | D-20 | D-21 | D-22 | D-23 |
|---|---|---|---|---|---|---|---|---|
| Polyester resin (A) No. | A-3 | A-3 | A-3 | A-3 | A-3 | A-3 | A-3 | A-3 |
| Second resin No. | PE-1 | PE-1 | PE-1 | SA-1 | SA-2 | SA-3 | SB-1 | SB-2 |
| Mixing ratio, polyester/second resin | 75/25 | 80/20 | 40/60 | 40/60 | 40/60 | 40/60 | 40/60 | 40/60 |
| Flow rate of mixed resin (kg/hr) | 5 | 5 | 5 | 5 | 5 | 5 | 5 | 5 |
| Isocyanate | 2,4-TDI | 2,4-TDI | 2,4-TDI | 2,4-TDI | 2,4-TDI | 2,4-TDI | 2,4-TDI | 2,4-TDI |

TABLE 2-continued

Preparation Examples D-1 to D-27

| Flow rate of isocyanate (g/hr) | 235.4 | 251.1 | 125.6 | 125.6 | 125.6 | 125.6 | 125.6 | 125.6 |
| --- | --- | --- | --- | --- | --- | --- | --- | --- |
| Gel fraction (wt %) Note 5) | 74 | 78 | 22 | 23 | 25 | 26 | 24 | 29 |
| Flow tester Tm value (°C.) | 170 | 178 | 150 | 157 | 152 | 163 | 145 | 150 |
| Tg (°C.) | 76 | 78 | 65 | 60 | 68 | 74 | 60 | 72 |
| Storability Note 6) | ⊚ | ⊚ | ⊙ | ○ | ⊚ | ⊚ | ○ | ⊚ |
| Lowest fixing temperature (°C.) Note 7) | 160 | 185 | 149 | 155 | 152 | 157 | 155 | 160 |
| Offset initiation temperature (°C.) Note 8) | 230< | 230< | 210 | 230 | 210 | 230< | 180 | 200 |
| Resistance to migration to polyvinyl chloride plasticizer Note 9) | ⊚ | ⊚ | ⊙ | ⊙ | ⊙ | ⊙ | ⊙ | ⊙ |
| Image density Note 10) | high | high | high | high | high | high | high | high |
| Background contamination Note 11) | ⊚ | ⊚ | ⊚ | ⊚ | ⊚ | ⊚ | ⊚ | ⊚ |
| Carrier contamination Note 12) | ⊙ | ⊙ | ⊙ | ⊙ | ⊙ | ⊙ | ⊙ | ⊙ |
| Inside or outside of scope of the present invention | inside | outside | inside | inside | inside | inside | inside | inside |

|  | D-24 | D-25 | D-26 | D-27 |
| --- | --- | --- | --- | --- |
| Polyester resin (A) No. | A-1 | A-1 | — | — |
| Second resin No. | PE-1 | SA-1 | PE-1 | SA-3 |
| Mixing ratio, polyester/second resin | 80/20 | 80/20 | 0/100 | 0/100 |
| Flow rate of mixed resin (kg/hr) | 5 | 5 | — | — |
| Isocyanate | 2,4-TDI | 2,4-TDI | — | — |
| Flow rate of isocyanate (g/hr) | 37.4 | 37.4 | — | — |
| Gel fraction (wt %) Note 5) | 1.1 | 1.4 | 0 | 0 |
| Flow tester Tm value (°C.) | 132 | 134 | 101 | 130 |
| Tg (°C.) | 70 | 60 | 68 | 65 |
| Storability Note 6) | ⊙ | ○ | Δ | ⊙ |
| Lowest fixing temperature (°C.) Note 7) | 140 | 142 | not detected | not detected |
| Offset initiation temperature (°C.) Note 8) | 152 | 155 | overall range | overall range |
| Resistance to migration to polyvinyl chloride plasticizer Note 9) | ○ | ○ | Δ | x |
| Image density Note 10) | high | high | very low | very low |
| Background contamination Note 11) | ⊙ | ⊙ | x | x |
| Carrier contamination Note 12) | ⊙ | ⊙ | x | x |
| Inside or outside of scope of the present invention | outside | outside | outside | outside |

TABLE 3

| Second resin No. | PE-1 | PE-2 |
| --- | --- | --- |
| KB 3000K (g) | 3440.0 | 3440.0 |
| Isophthalic acid (g) | 1931.0 |  |
| Dimethyl terephthalate (g) | 0.0 | 2252.9 |
| Amount of water removed (g) | 374.4 |  |
| Amount of methanol removed (g) |  | 855.8 |
| OH/COOH(Me) ratio prior to reaction | 0.87 | 0.8 |
| Acid value (mg KOH/g) | 34 | 1.2 |
| Hydroxyl value (mg KOH/g) | 1.9 | 2.2 |

| Second resin No. | Trade name | Name of Origin | Mn | Mw | Gel % | Tg (°C.) |
| --- | --- | --- | --- | --- | --- | --- |
| SA-1 | NEOCRYL B-1087 | ICI RESINS /US | 36000 | 63000 | 0 | 59 |
| SA-2 | NEOCRYL B-1085 | ICI RESINS /US | 15000 | 26000 | 0 | 63 |
| SA-3 | NEOCRYL B-1095 | ICI RESINS /US | 21000 | 41000 | 0 | 72 |
| SB-1 | Pliotone 2015 | GOOD YEAR TIRE AND RUBBER COMPANY | 24000 | 73000 | 0 | 57 |
| SB-2 | Pliotone 3015 | GOOD YEAR TIRE AND RUBBER COMPANY | 21000 | 152000 | 0 | 52 |

The present invention makes it possible to provide a toner composition for electrophotography which provides excellent various properties such as low temperature fixing ability, storability, offset resistance and resistance to migration of vinyl chloride plasticizers; which further makes it possible to prevent the formation of fine particles of toners due to the destruction of the toners and the contamination of carriers; and which can provide stable, good images during printing over a long period of time.

In other words, the toner composition of the present invention has melting properties upon heating suitable for fast reproduction such as a low lower limit of fixing temperature and a wide range for permitting fixing temperature. In addition, it also exhibits good resistance to blocking, resistance to carrier contamination and image-forming properties. Therefore, the toner composition of the present invention has excellent properties for use as toner composition for electrophotography.

We claim:

1. An electrophotographic toner comprising a coloring agent, a charge controlling agent and a binder resin (D) which contains at least 20% by weight of a urethane-modified polyester resin (C) obtained by reacting a polyester resin (A) with an isocyanate compound (B), and whose gel fraction generated from the polyester resin (A)/isocyanate compound (B) reaction ranges from 2% to 75% by weight, wherein the polyester resin (A)/isocyanate compound (B) reaction is effected by continuously adding isocyanate compound (B) to polyester resin (A) in an equivalent ratio (NCO/OH) of the amount of NCO groups of isocyanate compound (B) to OH groups of polyester resin (A) ranging from 0.3 to 1.0, and kneading using a kneading means having a built-in screw.

2. A toner according to claim 1, wherein polyester resin (A) is a polycondensation product of a member selected from the group consisting of polybasic carboxylic acids and lower alkyl esters thereof with a polyhydric alcohol.

3. A toner according to claim 2, wherein the polybasic carboxylic acid is an aromatic dibasic acid.

4. A toner according to claim 2, wherein the polyhydric alcohol is bisphenol A-propylene oxide adduct.

5. A toner according to claim 2, wherein the polyhydric alcohol is a mixture of at least 40 mol% of bisphenol A-propylene oxide adduct with other polyhydric alcohol(s).

6. A toner according to claim 2, wherein the ratio of polyhydric alcohol to the member selected from the group consisting of polybasic carboxylic acids and lower alkyl esters thereof, ranges from 0.8 to 1.4 expressed in terms of the ratio of the number of hydroxyl groups of the former to the number of carboxyl groups or ester residues of the latter.

7. A toner according to claim 1, wherein the hydroxyl value of the polyester resin ranges from 6 to 100 mgKOH/g.

8. A toner according to claim 1, wherein the gel fraction of binder resin (D) ranges from 10 to 60% by weight.

9. A toner according to claim 1, wherein the binder resin further comprises a member selected from the group consisting of styrenic resins, polyester resins, epoxy resins, rosins modified with maleic acid and petroleum resins all having a hydroxyl value of not more than 5 mgKOH/g.

10. A toner according to claim 1, wherein said kneading means is an extruder.

* * * * *